US011951957B2

(12) United States Patent
Haeusser et al.

(10) Patent No.: US 11,951,957 B2
(45) Date of Patent: Apr. 9, 2024

(54) VEHICLE BRAKE DEVICE COMPONENT

(71) Applicant: Robert Bosch GmbH, Stuttgart (DE)

(72) Inventors: Bernd Haeusser, Neckarwestheim (DE); Joern Kreutzer, Duelmen (DE)

(73) Assignee: ROBERT BOSCH GMBH, Stuttgart (DE)

(*) Notice: Subject to any disclaimer, the term of this patent is extended or adjusted under 35 U.S.C. 154(b) by 925 days.

(21) Appl. No.: 16/965,325

(22) PCT Filed: Feb. 21, 2019

(86) PCT No.: PCT/EP2019/054295
§ 371 (c)(1),
(2) Date: Jul. 28, 2020

(87) PCT Pub. No.: WO2019/170424
PCT Pub. Date: Sep. 12, 2019

(65) Prior Publication Data

US 2021/0114575 A1 Apr. 22, 2021

(30) Foreign Application Priority Data

Mar. 8, 2018 (DE) ........................ 102018203493.1

(51) Int. Cl.
*B60T 17/04* (2006.01)
*B60T 15/00* (2006.01)
*F16J 15/32* (2016.01)

(52) U.S. Cl.
CPC .............. *B60T 17/04* (2013.01); *B60T 15/00* (2013.01); *F16J 15/32* (2013.01)

(58) Field of Classification Search
None
See application file for complete search history.

(56) References Cited

U.S. PATENT DOCUMENTS

| | | | | |
|---|---|---|---|---|
| 2006/0112995 | A1 | 6/2006 | Kwon | |
| 2017/0334416 | A1* | 11/2017 | Ryu | B60T 8/4081 |

FOREIGN PATENT DOCUMENTS

| | | | | |
|---|---|---|---|---|
| CN | 106439021 A | * 2/2017 | | F16J 15/104 |
| CN | 107606247 A | 1/2018 | | |
| DE | 102014217447 A1 | 3/2016 | | |
| DE | 102016216347 A1 | 3/2018 | | |
| EP | 2372183 A1 | * 10/2011 | | F16D 65/18 |

OTHER PUBLICATIONS

International Search Report for PCT/EP2019/054295, dated May 14, 2019.

* cited by examiner

*Primary Examiner* — Melanie Torres Williams
(74) *Attorney, Agent, or Firm* — NORTON ROSE FULBRIGHT US LLP; Gerard A. Messina

(57) ABSTRACT

A vehicle brake device component, which has a first connection element including a sealing edge and a second connection element including a sealing surface, the sealing edge being placed tightly against the sealing surface in an initial position prior to a temperature change, and at least one of the two connection elements undergoes a change in size during the temperature change, in the process of which the sealing edge is displaced into an end position relative to the sealing surface, the sealing surface being developed in such a way that the sealing edge is placed tightly against it also in the end position.

10 Claims, 3 Drawing Sheets

10
16 50 48 38 36 52 12 44 54 56
16 36 38 52 12 46 54 56

40
14
12
28
20
26
24
18
16
22
32
30
10
12
14
40
42
36
28
38
20
34
16
18

VEHICLE BRAKE DEVICE COMPONENT

FIELD

The present invention relates to a vehicle brake device component, which has a first connection element including a sealing edge and a second connection element including a sealing surface, the sealing edge being placed tightly against the sealing surface in an initial position prior to a temperature change.

BACKGROUND INFORMATION

Vehicle brake devices are used to decelerate vehicles such as passenger cars or trucks in their driving speed while in motion and to stop them at their location during a standstill. Vehicle brake devices of this type have a variety of different components which, among other things, have to be tightly connected to one another during the assembly of the vehicle brake device. Such components placed tightly next to each other are denoted here as first connection element and second connection element.

The tight contact of one connection element with another connection element in a vehicle brake device in particular is required in order to allow a brake fluid to be enclosed in associated spaces of the vehicle brake device and to be pressurized there. The brake fluid is then used for generating the brake pressure at associated wheel brakes of the vehicle brake device.

The present invention is based on the object of improving a vehicle brake device component to the effect that no leakages occur at associated sealing edges of two connection elements even if changes in temperature occur.

SUMMARY

In accordance with an example embodiment of the present invention, a vehicle brake device component is provided, which has a first connection element including a sealing edge and a second connection element including a sealing surface, the sealing edge being placed tightly against the sealing surface in an initial position prior to a temperature change. The two connection elements are positioned and developed in such a way that at least one of the two connection elements is able to undergo, or undergoes, a free change in size during the temperature change, in the process of which the sealing edge is displaced into an end position relative to the sealing surface. According to the present invention, the sealing surface is furthermore formed in such a way that the sealing edge is placed tightly against the sealing surface even in the end position. The sealing surface is thus developed in such a way that the sealing edge is tightly positioned against it both in the initial position prior to the temperature change and in the end position following the temperature change.

To produce such a tight connection of two connection elements according to the present invention, the first connection element has a sealing edge, which usually has the form of a line. The second connection element has a sealing surface against which the sealing edge rests and which often has a three-dimensionally curved development.

The present invention is based on the understanding that material pairings of plastic, in particular polyamide and metal, in particular aluminum, are frequently used in vehicle brake device components. Different materials have different thermal coefficients of linear expansion and are therefore subject to changes in size of different magnitudes in response to temperature fluctuations.

Generally, an attempt is made to avoid size changes of varying magnitudes of different materials for the most part by preloading components. In the process, the connection elements are braced against each other during temperature changes so that preloading forces or press forces are generated, which are meant to exert pressure on the sealing points and thereby produce a sealing effect.

However, according to the present invention it was ascertained that the preloading diminishes over the service life of the components because material fatigue and settling occurs. The following scenario illustrates this situation. Aluminum has a coefficient of thermal expansion of 0.0000231 1/K (Kelvin). Polyamides, also known as nylon and Dederon, have a coefficient of thermal expansion of approximately 0.0001 1/K and therefore expand to a greater degree than aluminum in response to an increase in temperature. If a component of polyamide is firmly clamped into an aluminum housing, for example, then both components will expand in the presence of a temperature increase, but the polyamide is locked in the aluminum nevertheless. In the process the polyamide may become plastically, i.e., irreversibly, deformed. The relative size of the component of polyamide thus becomes irreversibly smaller in relation to its original size. If the temperature is subsequently lowered, the size of the component made of polyamide decreases to a greater extent, beyond its original size, before the temperature was raised. A gap between the associated components may possibly form in the process.

In contrast, according to the present invention, it is provided that the two connection elements are freely able to change their size during a temperature change without being subjected to any noteworthy distortions. This is achieved by providing sufficient space so that the sealing edge is able to freely move relative to the sealing surface. At the same time, the sealing surface is selectively shaped in such a way that during this displacement of the sealing edge relative to the sealing surface, the sealing edge is still positioned tightly against the sealing surface in the offset end position. Noteworthy preloads are tensions (defined as a force per area) that lie above 2 $N/mm^2$, in particular above 1 $N/mm^2$. A free change in size is understood as a change in size at which the associated connection element is deformed by less than 1%, in particular by less than 0.5%, with regard to the direction of the change in size (length, width, depth) in addition to the purely temperature-related deformation due to distortions.

An example embodiment according to the present invention ensures that tension-related deformations of the involved connection elements are excluded and the required tightness of the connection is ensured at the same time. A creation of gaps at the sealing connection, and thus also an escape of fluids or a penetration of foreign bodies, is therefore reliably prevented. Another advantage is that the vehicle brake device component according to the present invention is able to be used under quite different temperature conditions and temperature fluctuations. In addition, the disclosed vehicle brake device component is able to be provided in an economical manner.

The sealing edge is preferably circular. The circular form has the advantage of being easy to produce in a cost-effective manner. At the same time, the sealing surface to be allocated to the sealing edge is able to be ascertained particularly easily with regard to its geometrical design.

In one preferred embodiment of the present invention that is based thereon, the sealing surface is developed as a lateral surface of a cone of revolution or a truncated cone of revolution. A cone of revolution is a body of rotation and is produced by rotating a rectangular triangle about one of its legs. A truncated cone of revolution is likewise a body of rotation and is produced in that a smaller cone of revolution is cut off from a cone of revolution parallel to the base area. This embodiment is based on the understanding that a body homogeneously produced from a certain material basically enlarges or shrinks in size uniformly or proportionally in all directions in response to a change in temperature. With a change in temperature, the diameter of a circular sealing edge of a connection element thus also changes in proportion to the length of the connection element. According to the present invention, the sealing surface is to have a form that allows for a tension-free displacement of the sealing edge on the sealing surface. For the circular sealing edge this form is a lateral surface of a cone of revolution or a truncated cone of revolution, adapted to the diameter of the sealing edge and positioned at a slant with respect to the cone axis. The sealing surface itself or a lateral surface line of the sealing surface is preferably described by a mathematical function.

The sealing surface is advantageously developed in such a way that the sealing edge also rests tightly against it in any position between the initial position and the end position. As a result, a guidance of the sealing edge on the sealing surface is realized from the initial position to the end position. This embodiment has the advantage that no gap is created at the sealing edge even when the sealing edge changes its position in relation to the sealing surface. The sealing surface may advantageously be a surface of a projecting section of a connection element, but also a surface of a depression or an opening in a connection element.

In one preferred embodiment of the present invention, the connection elements are produced from materials that differ from one another. Generally, the individual connection elements have different functions. The individual function of a connection element is able to be satisfied to particularly good effect by the connection element when it is made of a material that is suitable for this function. A tight contact of the sealing edge with the sealing surface in the event of temperature changes is ensured according to the present invention.

One of the connection elements is preferably a filter element. The filter element in particular protects the associated other connection element, which is tightly coupled with the filter element, from contamination.

In accordance with the present invention, in one advantageous embodiment based thereon, the filter element has a housing that forms the sealing surface or the sealing edge. The housing thus forms the base structure for the filter element and simultaneously ensures its tightness.

In one further preferred embodiment of the present invention, one of the connection elements is a switching valve. Switching valves are used for the control of the brake pressure of wheel brakes within an electronic stability program or an anti-lock braking system. In a particularly advantageous manner, they are able to be protected from contamination with the aid of filter elements.

Accordingly, the example vehicle brake device component according to the present invention is preferably a component of a hydraulic power unit as it is used for an electronic stability program (ESP) or an anti-lock braking system (ABS). The electronic stability program (ESP) is an electronically controlled driver assistance system for motor vehicles that counteracts skidding of a car by the selective braking of individual wheels. The anti-lock braking system (ABS) is a technical system for greater driving safety and less wear on tire treads of wheels and counteracts possible locking of the wheels during braking by reducing a brake pressure.

All described embodiments for the vehicle brake device component include corresponding methods for their production and use. For instance, the present invention is also selectively directed to the use of such a vehicle brake device component in a vehicle brake device.

In addition, further embodiments are possible. For example, when a coefficient of thermal expansion of a material changes within a temperature range and a connection element made from this material is used within this temperature range, the sealing surface is to be adapted in such a way that the sealing edge rests tightly against the sealing surface in its initial position, end position and in any position between the initial position and the end position.

Below, an exemplary embodiment of the present invention is described in greater detail with the aid of the figures.

DETAILED DESCRIPTION OF EXAMPLE EMBODIMENTS

Figure 1:
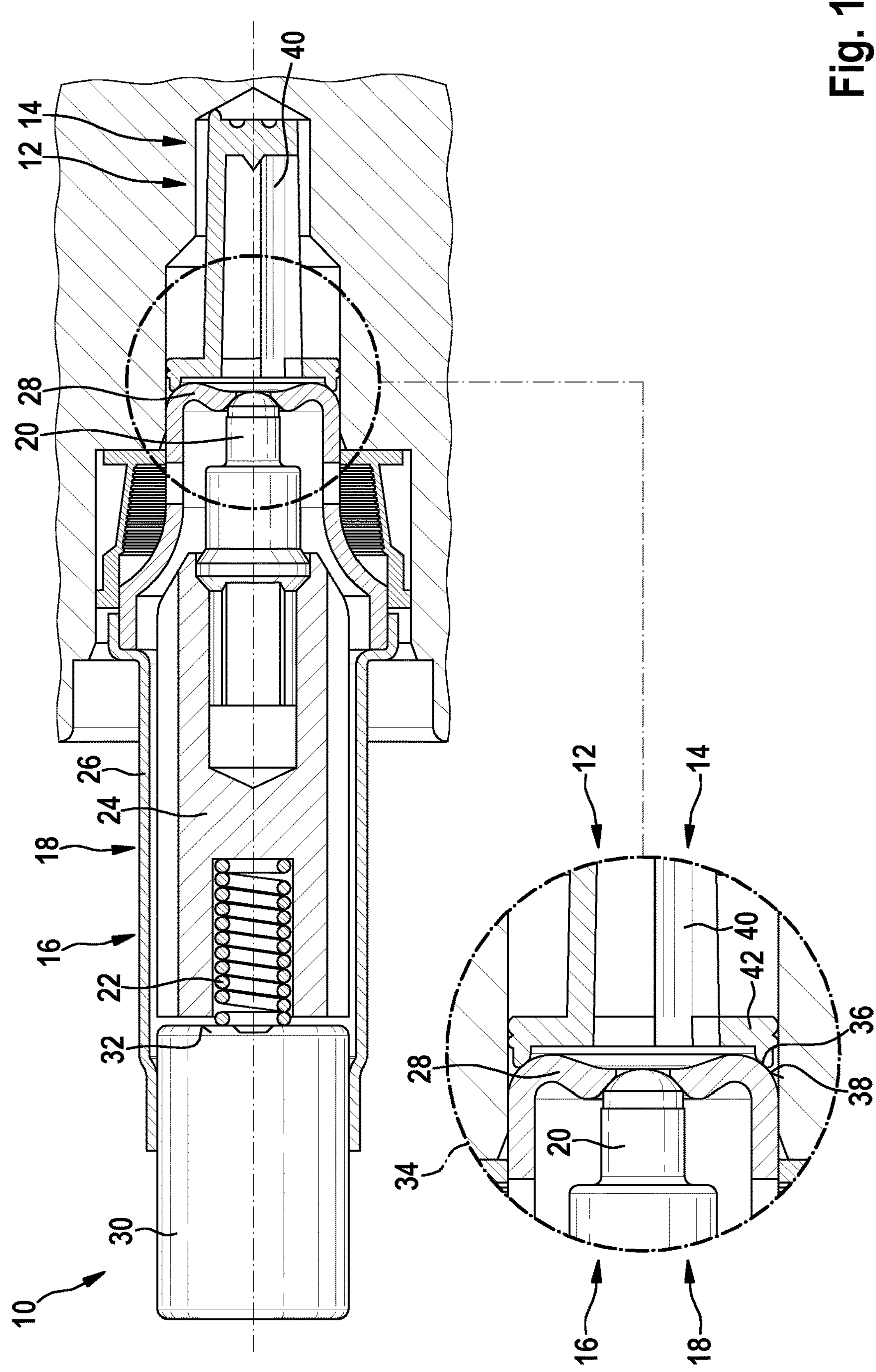
FIG. 1 shows a longitudinal section of an exemplary embodiment of a vehicle brake device component according to the present invention.

In FIG. 1, an exemplary embodiment of a vehicle brake device component 10 is shown.

Vehicle brake device component 10 is fully shown in the upper part of FIG. 1 and to the left includes a first connection element 12, which is embodied here as an essentially cylindrical filter element 14, and a second connection element 16 to the right, which is embodied here as an also essentially cylindrical switching valve 18.

Switching valve 18 includes a tappet or bolt 20 and a spring 22, which are situated in the interior of a hollow-cylindrical housing 26. An end of switching valve 18 facing filter element 14 forms a first, right limit stop 28 for bolt 20. At the opposite, other end of switching valve 18, which is situated to the left of spring 22, a brake contact element 30 is provided, which forms a second, left limit stop 32 for bolt 20. When switching valve 18 is in operation, bolt 20 is able to be moved back and forth between these limit stops 28 and 32 with the aid of an electromagnet (not shown).

The circled region in the upper part of FIG. 1 is shown in an enlarged view 34 in the lower part of FIG. 1. A sealing edge 36 of filter element 14 and a sealing surface 38 of switching valve 18 are situated in this area. Sealing edge 36 rests tightly against sealing surface 38.

Filter element 14 includes a filter medium 40 and a housing 42 made of plastic. Sealing edge 36 is situated radially outside, in an annular circumferential form, at the likewise circular front end of housing 42.

Sealing surface 38 is situated in an annularly circumferential form at the also annular limit stop 28. Limit stop 28 is produced from steel.

Sealing edge 36 and sealing surface 38 are shaped in mutually adapted form and situated so that sealing edge 36 is able to vary its position on sealing surface 38 in a manner largely free of tension during a change in temperature. This makes it possible to keep such a connection made up of sealing edge 36 and sealing surface 38 tight in all temperature situations.

Figure 2:
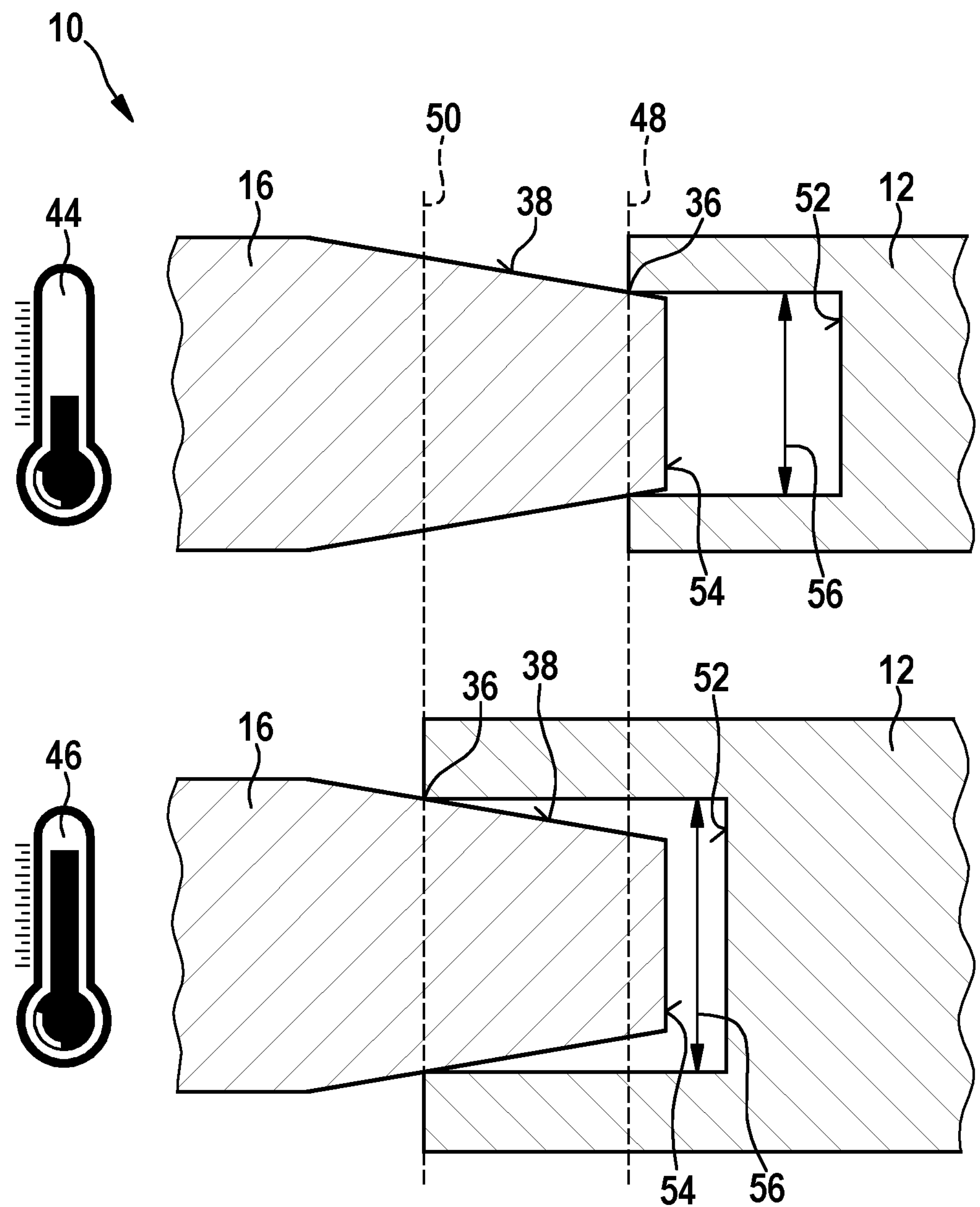
FIG. 2 shows a schematic diagram of a second exemplary embodiment of a vehicle brake device component according to the present invention.
Figure 3:
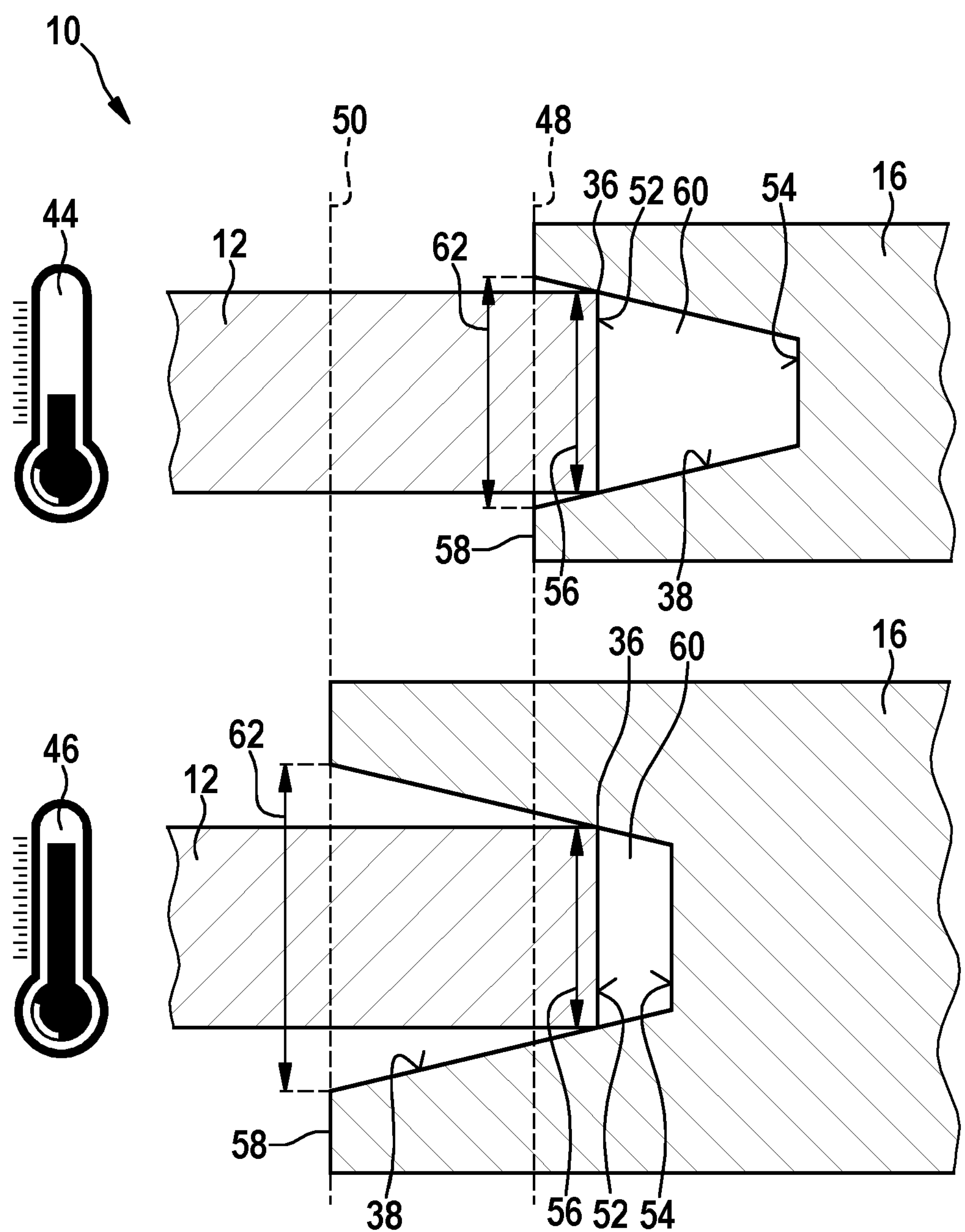
FIG. 3 shows a schematic diagram of a third exemplary embodiment of a vehicle brake device component according to the present invention.

The exemplary embodiment according to FIG. 1 shows the constructive design of a device of this type in an exemplary manner. FIGS. 2 and 3 then describe the precise placement and method of functioning of such a connection made up of sealing edge 36 and sealing surface 38 in the form of a schematic diagram in each case.

According to FIG. 2, vehicle brake device component 10 once again has a first hollow-cylindrical connection element 12 including a radially inward directed, circular sealing edge 36 and a second cylindrical connection element 16 having a radially outward facing, frustoconical sealing surface 38. A front end limit stop 52 of first connection element 12 faces a front end limit stop 54 of second connection element 16.

In FIG. 2, vehicle brake device component 10 is shown twice on top of each other. In the upper part of FIG. 2, vehicle brake device component 10 is shown in a state in which its temperature 44 is relatively low. In particular, temperature 44 is lower than a temperature 46, which vehicle brake device component 10 has in a state according to the lower part of FIG. 2.

Vertical lines in the two parts of FIG. 2 represent an initial position 48 and an end position 50 of associated sealing edge 36 at its sealing surface 38.

In the selected schematic diagram according to FIG. 2, it is assumed for the sake of simplicity that in a temperature change essentially only first connection element 12 changes its size due to a relatively high first coefficient of thermal expansion. Second connection element 16, on the other hand, does not change its size or changes it only slightly at the same temperature change on account of a relatively low second coefficient of thermal expansion in comparison with the first coefficient of expansion.

As mentioned, sealing edge 36 is circular, and sealing surface 38 is developed as a lateral surface of a truncated cone of revolution. At lower temperature 44, sealing edge 36 is located in initial position 48 on sealing surface 38 formed in this way, and at higher temperature 46, it is in end position 50. A diameter 56 of sealing edge 36 in the state of lower temperature 44 is smaller than in the state of higher temperature 46. At the same time, first connection element 12 becomes longer as the temperature rises and its front end together with sealing edge 36 there is displaced in the axial direction from an initial position 48 to an end position 50.

With a temperature change from lower temperature 44 to higher temperature 46, sealing edge 36 is thus displaced along or on sealing surface 38 from initial position 48 to an end position 50 free of tension and at the same time in a sealing manner, in such a way that no gap is created between sealing edge 36 and sealing surface 38.

Vehicle brake device component 10 according to FIG. 3 also has a first connection element 12 including a sealing edge 36 and a second connection element 16 including a sealing surface 38. However, the placement of connection element 12 and connection element 16 is now laterally offset in comparison with FIG. 2. Vehicle brake device component 10 in FIG. 3 is also shown twice on top of each other.

In the upper part of FIG. 3, vehicle brake device component 10 is shown in the particular state in which its temperature 44 is lower than temperature 46 of another state in which vehicle brake device component 10 is in the lower part of FIG. 3. Associated sealing edge 36 on first connection element 12 is once again circular on the front end, and sealing surface 38 on second connection element 16 is also developed as a lateral surface of a truncated cone of revolution. Sealing surface 38 is developed as an inner radial side surface of a depression 60 on the front end in second connection element 16. A first limit stop 52 on the front end of first connection element 12 is once again facing a radially aligned base surface of depression 60, which forms a second limit stop 54 of second connection element 16.

Vertical lines in FIG. 3 represent initial position 48 and end position 50 of a front end 58 of second connection element 16 relative to first connection element 12.

To simplify matters, it is assumed in the case of FIG. 3 that essentially only second connection element 16 changes its size in response to a temperature change. As a result, a diameter 56 of sealing edge 36 in the state of lower temperature 44 is essentially as large as in the state of higher temperature 46.

On the other hand, a circular outlet opening 62 of depression 60 on front end 58 of second connection element 16 has a smaller diameter in the state of lower temperature 44 than in the state of higher temperature 46. Sealing surface 38 thus becomes larger with regard to its inner diameter as the temperature rises. At the same time, second connection element 16 becomes longer with a rise in temperature so that its front end 58 as well as depression 60 with its limit stop 54 shift to the left in relation to FIG. 3.

During this process, sealing edge 36 is displaced again along the gradient of sealing surface 38 thus adapted and in a largely tension-free and simultaneously sealing manner so that no gap is created between sealing edge 36 and sealing surface 38.

What is claimed is:

1. A vehicle brake device component, comprising:

a first connection element including a sealing edge;

a second connection element including a sealing surface, the sealing edge being tightly against the sealing surface in an initial position prior to a temperature change;

wherein the first connection element and the second connection element are positioned and configured in such a way that at least one of the first connection element and the second connection element is able to undergo a free change in size during the temperature change, during which the sealing edge is displaced into an end position relative to the sealing surface, and the sealing surface is formed in such a way that the sealing edge is tightly against the sealing surface also in the end position;

wherein the sealing surface is a lateral surface of a cone of revolution or a truncated cone of revolution.

2. The vehicle brake device component as recited in claim 1, wherein the sealing edge has a circular configuration.

3. The vehicle brake device component as recited in claim 1, wherein the sealing surface is configured in such a way that the sealing edge also rests tightly against the sealing surface in any position between the initial position and the end position.

4. The vehicle brake device component as recited in claim 1, wherein the first connection element and the second connection element are produced from different materials relative to each other.

5. The vehicle brake device component as recited in claim 1, wherein the vehicle brake device is a component of a hydraulic power unit.

6. A vehicle brake device component as recited in claim 1, comprising:

a first connection element including a sealing edge;

a second connection element including a sealing surface, the sealing edge being tightly against the sealing surface in an initial position prior to a temperature change;

wherein the first connection element and the second connection element are positioned and configured in such a way that at least one of the first connection element and the second connection element is able to undergo a free change in size during the temperature change, during which the sealing edge is displaced into an end position relative to the sealing surface, and the sealing surface is formed in such a way that the sealing edge is tightly against the sealing surface also in the end position;

wherein one of the first connection element and the second connection element is a filter element.

7. The vehicle brake device component as recited in claim 6, wherein the sealing surface is a lateral surface of a cone of revolution or a truncated cone of revolution.

8. The vehicle brake device component as recited in claim 6, wherein the filter element has a housing forming the sealing surface or the sealing edge.

9. A vehicle brake device component, comprising:

a first connection element including a sealing edge;

a second connection element including a sealing surface, the sealing edge being tightly against the sealing surface in an initial position prior to a temperature change;

wherein the first connection element and the second connection element are positioned and configured in such a way that at least one of the first connection element and the second connection element is able to undergo a free change in size during the temperature change, during which the sealing edge is displaced into an end position relative to the sealing surface, and the sealing surface is formed in such a way that the sealing edge is tightly against the sealing surface also in the end position;

wherein one of the first connection element and the second connection element is a switching valve.

10. A vehicle brake device, comprising:

a vehicle brake device component, including:

a first connection element including a sealing edge;

a second connection element including a sealing surface, the sealing edge being tightly against the sealing surface in an initial position prior to a temperature change;

wherein the first connection element and the second connection element are positioned and configured in such a way that at least one of the first connection element and the second connection element is able to undergo a free change in size during the temperature change, during which the sealing edge is displaced into an end position relative to the sealing surface, and the sealing surface is formed in such a way that the sealing edge is placed tightly against the sealing surface also in the end position;

wherein one of the first connection element and the second connection element is a filter element.

* * * * *